June 7, 1955  H. GUTTON ET AL  2,710,364
CAVITY RESONATOR MAGNETRON
Filed Jan. 17, 1949  6 Sheets-Sheet 1

INVENTORS:
HENRI GUTTON,
ANTOINE JEAN ORTUSI, AND
RAPHAEL FRUMKIN
By John B. Brady
ATTORNEY Fig: 3

INVENTORS:
HENRI GUTTON,
ANTOINE JEAN ORTUSI, AND
RAPHAEL FRUMKIN
By John B. Brady
ATTORNEY June 7, 1955 H. GUTTON ET AL 2,710,364
CAVITY RESONATOR MAGNETRON
Filed Jan. 17, 1949 6 Sheets-Sheet 4

INVENTORS:
HENRI GUTTON,
ANTOINE JEAN ORTUSI, AND
RAPHAEL FRUMKIN
By John B. Brady
ATTORNEY June 7, 1955   H. GUTTON ET AL   2,710,364
CAVITY RESONATOR MAGNETRON
Filed Jan. 17, 1949   6 Sheets-Sheet 5

INVENTORS:
HENRI GUTTON,
ANTOINE JEAN ORTUSI, AND
RAPHAEL FRUMKIN
BY John C. Brady
ATTORNEY

Fig. 12

INVENTORS:
HENRI GUTTON,
ANTOINE JEAN ORTUSI, AND
RAPHAEL FRUMKIN
By John B. Brady
ATTORNEY

United States Patent Office 2,710,364
Patented June 7, 1955

2,710,364

CAVITY RESONATOR MAGNETRON

Henri Gutton, Antoine Jean Ortusi, and Raphaël Frumkin, Paris, France, assignors to Compagnie Generale de Telegraphie Sans Fil, a corporation of France Application January 17, 1949, Serial No. 71,264

3 Claims. (Cl. 315—39.69)

The present invention relates to ultra-short wave transmitting tubes of the so-called magnetron type, and the circuits for using same. It more particularly concerns magnetrons with resonant cavities, irrespective of the shape and arrangement thereof, and in general, covers any magnetron or like tube wherein there is a chain of inter-coupled circuits.

Owing to this coupling between the resonant cavities and the feed-back produced by such coupling, the usual magnetrons have a tendency to self-oscillation and can scarcely be used otherwise than as oscillators. Said cavities have a very high quality factor and the frequency of the oscillations can only be tuned within very narrow limits, of the order of 1%. In order to widen the tuning band, it has already been proposed to vary the shape or the size of the cavities or to use in combination a plurality of magnetrons of different parameters that oscillate on different frequencies. In the first case, a slight widening of the band was obtained, but at the exepense of a complication in the means of constructing and of tuning the tube, which precluded the practical application of this artifice. In the second case, too complicated and costly installations were involved.

On the other hand, the usual tendency of a magnetron to oscillate has heretofore precluded all use of a tube of this type as a signal amplifier or as a generator of signals capable at the same time of modulating same, and similarly any other application of the magnetron incompatible with its permanent state of self-oscillation on a very definite frequency was likewise precluded.

The present invention has for its object a novel method of constructing magnetrons with resonant cavities and the like, which enables their tendency to self-oscillation to be regulated, to be decreased or even completely eliminated, thereby making it possible either to widen their band of oscillation frequencies very substantially, or to use them as stable amplifiers and in any other mode based on this stability of operation.

According to the invention, an artificial coupling is inserted between the cavities which acts in opposition to their natural coupling and behaves like a negative feed-back device that has the effect of decoupling the cavities.

Said negative feed-back device may be in the form of a constructional modification of the magnetron and be given a fixed value which is adjusted once and for all according to the function that the magnetron is intended to perform.

It may also be constructed in an adjustable mode, by connecting the cavities to one another by means of a circuit outside the magnetron, that enables the decoupling to be adjusted and, if desired, the phase thereof to be changed.

According to a modification of construction, the negative feed-back is obtained by means of grooves which are provided laterally in the walls of the cavities and directly connect said cavities to one another, inside the anode body. By acting on the depth of said grooves, it is possible to adjust the degree of negative feed-back.

By giving said grooves a suitable cross-sectional shape, it is even possible to impart a selective effect to the decoupling that they produce. Finally, it is possible to vary the effect of the grooves by allowing more or less conducting bodies of a suitable shape to penetrate therein.

According to another embodiment of the decoupling method, two adjacent segments of the anode are connected to one another by short-circuit staples called "straps," in which case, in order to favor the "$\pi$ mode of oscillation" and eliminate the other undesirable modes, a rounded shape is preferably given to the anode segments that has the effect of producing a distribution of the electric field that favors the mode $\pi$. The decoupling is adjusted by giving in particular a suitable length to said straps.

According to another modification, while obtaining the negative feed-back by means of the staples, as hereinbefore proposed, the mode $\pi$ of oscillation is fixed by connecting, according to a conventional method, the odd numbered segments and the even numbered segments to one another by means of the straps.

According to another modification, two cavities which it is required to decouple are connected to one another by means of a circuit outside the magnetron, said circuit terminating by coupling means or plugs that penetrate into said cavities. Said circuit contains adjustable means, such as a condenser, that enables the negative feed-back to be adjusted at will while the tube is operating, and said circuit may, on the other hand, be completed by means such as pistons combined with guides, for enabling the phase of said negative feed-back to be adjusted.

This negative feed-back device connects two adjacent cavities or two other cavities to one another, one of which behaves as an output cavity, the other as an input cavity, taking into account the direction of propagation of the electronic flux in front of said cavities.

The degree of negative feed-back can be adjusted either by acting on the coupling between the negative feed-back device and the cavities, or by altering the ultra-high frequency transmitting power of said device which may include a resonator in any suitable form.

The invention thus covers any magnetron or like tube, wherein the resonant cavities or resonant anode elements are decoupled as indicated. In certain cases, the magnetron according to the invention is provided with a small number of cavities, which may even be restricted to two cavities, which are connected to one another by a negative feed-back circuit.

By adjusting the negative feed-back, it is possible either to obtain a reaction amplifier, or, if high fidelity is desired, to decouple completely the resonant cavities of the magnetron.

The provision of the negative feed-back enables the operational characteristics of a magnetron to be improved, to make the flow of the anode current start more suddenly and thereby substantially decrease the retarding effect which is encountered in ordinary magnetrons, said retarding effect being due to the existence of a strong residual anode current previous to producing the conditions for rendering the magnetron conducting. This current produces "background noises" that prevent satisfactory amplification. By eliminating them, the invention thus enables the degree and the quality of the amplification to be increased and magnetrons to be used for receiving even very weak signals and, consequently in the first stage of an amplifier.

According to a modification of construction, an amplification stage is formed by means of two cavities which are connected to one another by a decoupling circuit and one of which, taking into account the direction of the electron flow, receives the signal and acts as an input circuit, the other acting as an output circuit and being combined with a member for picking up the amplified signal.

Said two cavities may be located beside one another, in which case a one-stage amplifier is obtained; or they may be separated by a member of intermediate cavities which are decoupled with respect to one another, thereby forming an arrangement which is equivalent to a multi-stage amplifier.

According to another modification, the two consecutive cavities that form a stage of amplification are located some distance from one another and the decoupling groove provided between them in the anode body is of a suitable shape that enables the frequency-band to be widened. For this purpose, it is possible in particular to provide between the cavities that act as input and output circuits a plurality of cylindrical cavities, each of which is resonant on a particular frequency where these various frequencies being adjacent, and said cavities are connected to one another by grooves. It is also possible to add to the resonant cavity that acts as an input circuit, an additional cavity which does not communicate with the anode-cathode space and which is tuned to a different frequency adjacent to that of the input cavity. The same arrangement may be provided for the output circuit.

It is also possible to alter the frequency band by acting in a suitable manner on the decoupling device located outside the magnetron.

The magnetron may have a solid anode ring which is only provided with the resonant cavities used for the amplification.

It is also possible to use a normal anode with cavities distributed over its entire periphery, only a part of said anode being used for the amplification. In this case, it is necessary to provide means for determining the $\pi$ mode of oscillation.

According to the invention, in order to adjust the operation of the amplifier, it is possible to act either on the anode voltage, or on the magnetic field, or on both together, in such manner as to give the most suitable value to the anode current.

In order to reduce the time taken for the anode current to start and impart thereto the form of short pulses and thereby cause the magnetron to operate as a class C amplifier, it is possible to act in the desired direction on the magnetic field or, preferably, on the electric field in front of the cavities, by weakening said field opposite the output cavity.

This result is obtained by shifting the cathode out of center and moving it closed to the input cavity.

In order to prevent the electrons, after their exchange of energy with the electric wave of the magnetron and after the amplification effect has been obtained, from returning in front of the input cavity, screens may be provided in their paths, or, so as not to complicate the manufacture, they may be stopped by a suitable field that produces a focussing effect.

Finally, according to the invention, it is possible to combine in the same magnetron the amplification of the signal received with the production of a local oscillation which is controlled as will be explained hereinafter, so as to obtain a frequency change. For this purpose, use is made of different cavities which are decoupled accordingly: the "oscillator" and "amplifier" portions are connected to one another through the space between the anode and the cathode.

By suitably adjusting the degree of negative feed-back and, in particular by giving a suitable depth to the grooves provided in the magnetron, it is possible, while retaining its oscillating properties, to widen substantially its transmitting curve as a function of the frequency.

The invention also covers the application of such a magnetron provided with negative feed-back to producing oscillations with a comparatively wide frequency-band; it has for one of its objects more particularly the combination of such a magnetron or like tube, with a device that enables the frequency of the oscillations to be varied and, more accurately, that enables the desired frequency or narrow band of frequencies to be selected in the given transmission curve.

This tuning device is formed by a resonant space which has a high quality-factor and the natural frequency of which is adjustable by any usual means and, in particular, by changing its volume. Said device is directly connected to one of the cavities of the magnetron, or it may be connected, in particular by means of coaxial cables, to various cavities.

This device may be of the shape of a guide section which is terminated by a horn or by any other radiating means.

The invention will be more clearly understood by means of the figures of the accompanying drawings, one part of which explains the operation thereof and another part illustrates its embodiments by way of non-limitative examples.

Fig. 1 shows the distribution of the fields and the currents in a conventional magnetron provided with cylindrical cavities;

Fig. 2 shows an electric diagram thereof, that illustrates the presence of a feed-back that causes self-oscillation;

Fig. 3 shows the equivalent diagram, obtained artificially by separating the electron flow from the resonant circuits formed by the cavities, thereby enabling their back-coupling to be shown more clearly;

Fig. 4 shows the conventional transmission curve of a magnetron as a function of the frequency;

Fig. 5 shows the diagram of Fig. 3, completed according to the invention so as to introduce the negative feed-back effect;

Fig. 6 shows an embodiment by means of grooves;

Fig. 7a illustrates an industrial construction of said grooves;

Fig. 8 repeats a fraction of Fig. 7a which contains a groove and is intended to explain the distribution of the currents that such an arrangement involves;

Fig. 9 shows an equivalent electric diagram that gives a clear explanation of the function of the groove as a decoupling circuit;

Fig. 10 shows a diagram of the experimental study of decoupling;

Fig. 11 shows the transmission curves as a function of the frequency thus obtained, by varying the degree of such decoupling.

In all these figures, the same reference symbols designate the same elements.

Fig. 1 shows a portion of a conventional magnetron provided with resonant cavities B of cylindrical shape, which are connected through slits F to the space which is bounded, on one side by the anode mass A of which said cavities form a part, and on the other side by the cathode K. Arrows show the distribution of the current $i$ and of the high-frequency electric field $e$ corresponding to the mode of oscillation $\pi$. According to this mode of oscillation, the lines of force issue from one of the segments D and extend to the adjacent segment, these two segments thus being of different polarities. All the even numbered segments or teeth are of the same polarity, and so are all these odd numbered segments. A portion of the lines extends between the anode and the cathode. Another portion passes through the slits. The currents $i$ are conduction currents which follow the surface of the cavity and which are of opposite phase from one cavity to the adjacent cavity. In order not to complicate the drawing the magnetic field to which the magnetron is subjected has not been shown, the lines of force of said magnetic field being assumed to pass parallel to the axis of the cathode, in the gap of a magnet not shown.

Fig. 2 shows an electric diagram obtained from Fig. 1. The straight line K—K that serves as a datum line corresponds to the cathode K developed in a straight plane. The elemental oscillating circuit is formed by the inductance L that corresponds to the inside of the cavity and by the capacity C that corresponds to the slit F. The inductances $l$ of Fig. 2 take into account the coupling between the cavities which is due to the existence of a conduction current that flows along the inner surface of the anode. The capacities $\gamma$ represent the electric lines of force which pass between the cathode and the anode.

In order to determine the mode of oscillation $\pi$ and eliminate all the others, it is possible to use, either a conventional method called "strapping," which comprises connecting to one another by means of straps the segments of the same high-frequency polarity—i. e. the segments $D_1$, $D_3$, and so forth, on the one hand, and the segments $D_2$, $D_4$ and so forth, on the other hand—or a method that comprises giving a rounded shape that corresponds to a suitable profile, to the portion of the segments facing the cathode, as described in the patent application filed on April 14, 1948, U. S. Serial No. 21,067, now Patent 2,610,309, granted September 9, 1952, to Henri Gutton for "Improvements in Magnetrons or Like Tubes Intended for Transmitting Ultra-Short Waves."

When the curve is plotted, which gives, as a function of the frequency F, the coefficient of transmission T through two elemental cells of the magnetron, like those described with reference to Fig. 2, experience shows that the curve of Fig. 4 is obtained, which is formed of two completely separated frequency-bands. This curve is characteristic of the existence of two circuits which are much more tightly coupled than the critical coupling. The coupling and consequently, the separation of the frequency-bands is further increased by the use of "strapping" or of magnetrons with rounded teeth. A magnetron provided with N cavities operates in this case like a filter which is closed across itself and has 2N resonance frequencies. The separation of these frequencies is desired in order to obtain a greater frequency stability, by preventing possible oscillations on two adjacent wavelengths. The tight coupling which exists between the cavities of the magnetron favors the maintenance of the oscillations inside the electron tube, since the electron flow which is emitted by the cathode and is curved by the magnetic field gives up its energy to the field $e$ of Fig. 1 as it passes in front of the slits; it is alternatingly modulated at the frequency of said field $e$. Consequently, each cavity of the magnetron, which is associated with said flow, performs the function of the grid of an ordinary thermionic tube and the oscillating circuit thereof.

This design makes it possible to represent the circuits of the magnetron in the manner shown in Fig. 3, wherein the electron stream $\Phi$ is separated from the adjacent resonant cavities $B_1$—$B_2$ and is in a state of energy exchange with same by means of the imaginary grids $G_1$ and $G_2$. This diagram is reminiscent of that of a triode with an input circuit $B_1$ and an output circuit $B_2$ which are back-coupled so as to produce a state of self-oscillation. The effect of the direct current grid-bias voltage that regulates the output of the electrode is in this case replaced by the effects of the magnetic field and of the distance between the electrodes. It is known that the oscillations which are set up in circuits essentially depend on the coupling between such circuits. The coupling must exceed a critical value called "critical coupling for continuous oscillation."

Since this condition always exists in a magnetron with resonant cavities, such a magnetron has a marked natural tendency to self-oscillation and thus behaves like a triode with back-coupled anode and grid circuits so as to make it into an oscillator.

This property of magnetrons has hitherto prevented them from being used as ultra-short wave amplifiers and any attempt made in this direction has been stopped by the instability of operation and the spontaneous production of oscillations.

On the other hand, since the resonant cavities have a very high quality-factor, the magnetron oscillates, as shown in Fig. 4, on a very limited frequency-band and in practice on a single frequency, which cannot be tuned by means of the characteristics of external circuits. Now, in the problems of electromagnetic detection of obstacles, it is particularly important to have oscillator magnetrons wherein the frequency can be conveniently varied, because of the difficulty of obtaining wide bandpasses in the various apparatus through which the high-frequency currents travel. It is possible to attempt to overcome the difficulty by changing the characteristics of the internal circuits, but this latter problem cannot be solved in a practical manner in the case of high power, in which case the use of the magnetron is precluded as a variable frequency oscillator.

Fig. 5 shows diagrammatically the idea of the invention in its most general form. It comprises connecting the resonant circuits $B_2$, $B_1$ to one another by an additional circuit R and, in particular, in such a manner that said circuit R behaves as a negative feed-back that tends to decrease the natural coupling M shown by the arrow H in Fig. 5. The negative feed-back circuit R may exert an electrostatic action, or an electromagnetc action, or both together. Its function will be explained in greater detail in connection with Figs. 6 to 9. The electron flow $\Phi$, the direction of which is determined by the direction of the magnetic field combined with the electric field, which always travels from the anode to the cathode, passes first in front of the resonant cavity $B_1$ and then in front of the cavity $B_2$. The cavity $B_2$ may thus be assimilated to an output circuit, whereas the cavity $B_1$ behaves like an input circuit and the device R (Fig. 5) serves to backcouple the output circuit to the input circuit so as to decrease the natural coupling M.

By varying the degree of this negative feed-back, it is possible to decrease at will the tendency of the magnetron to self-oscillation and even eliminate it completely. In the first case, oscillator magnetrons are obtained with a comparatively wide tuning band; in the second case, they can be allotted the function of very stable amplifiers.

Fig. 6 shows an embodiment of this decoupling and the electric conditions resulting therefrom. The two adjacent cavities $B_1$ and $B_2$ are directly connected to one another through the anode mass by means of a passage or groove S. The practical construction of said passage is shown in Fig. 7a which shows a sectional perspective view of a portion of a magnetron. Said groove or passage is provided in the narrowest part of the anode segment and it is given a width $d$ and a depth $p$ (see Fig. 7a) which are the most suitable for the functions which it is desired to make the magnetron fulfill. Fig. 6 thus shows a section of Fig. 7a through a plane at right angles to the cathode and passing through the groove.

The characteristic parameters of the negative feed-back comprise both the width $d$ of the groove and its depth $p$ which may be a large fraction of the total depth of the cavity without risk of deformation occurring when the tube is being exhausted.

The action exerted by the grooves is due to the interruption of the circulation current $i$ which flows transversely along the cylindrical cavity. Fig. 8, which shows the groove alone, shows that the circulation current $i$ is divided into three parts at the level of the groove:

a. One part $J$ flows along the bottom of the groove which thus forms an inductance $L'$ with respect to the total current $i$.

b. A second part produces a displacement current which is characterized by the electric field $e'$ at right angles to the lips of the groove.

c. A third part $i'$ flows along the elemental line that connects the cavities to one another.

The decoupling effect produced by the grooves is due to the influence of this latter current $i'$, since Fig. 6 shows that the circulation current $i'$ is in phase with the current $i$ of the cavity $B_2$.

It is therefore in phase opposition with the current $-i$ of the cavity $B_1$ which is due to the existence of the "mode $\pi$" of oscillation. It consequently tends to decrease the coupling between the two adjacent cavities.

In Fig. 9 the equivalent diagram has been shown of the magnetron derived from Fig. 2 and completed by the electrical changes introduced by the groove. Said groove is equivalent to a decoupling circuit $S$ which is created by the current $i'$ and which is inductively connected ($L'$, $L'$) to the resonant circuits ($L$, $C$) of the cavities. For the sake of greater simplicity, account is not taken in this diagram of the capacity $C'$ produced by the field $e'$ (see Fig. 8). The inductance $L'$ and the coefficient of coupling $N$ increase with the depth of the groove. The variation of the width $d$ acts in the same manner. The coefficient of coupling $N$ is negative, i. e. it has the effect of producing a current $i'$ in the resonant circuit $B_1$ which is in opposition to and tends to decrease the current $-i$ normally flowing through said circuit $B_1$.

With suitable dimensions of the grooves, the system comprising $L'$ and the capacity $C'$ not shown behaves as a positive reactance; said reactance is added to the inductance $L$ and consequently increases the natural periodicity of resonance of each cavity. Thus, for example, the introduction of a groove 12 mm. deep and 3 mm. wide changes the wavelength of oscillation from 10 cm. to 12 cm. for a magnetron of the usual type provided with cavities 8 mm. in diameter by 20 mm. deep. The same effect is produced on all the resonance curves, which are shifted towards higher wavelengths.

This theory of operation has been given solely in order to make the object and the scope of the invention more clearly understood, but of course the invention must not be considered as being limited by the contents of this explanation.

Figure 7B:
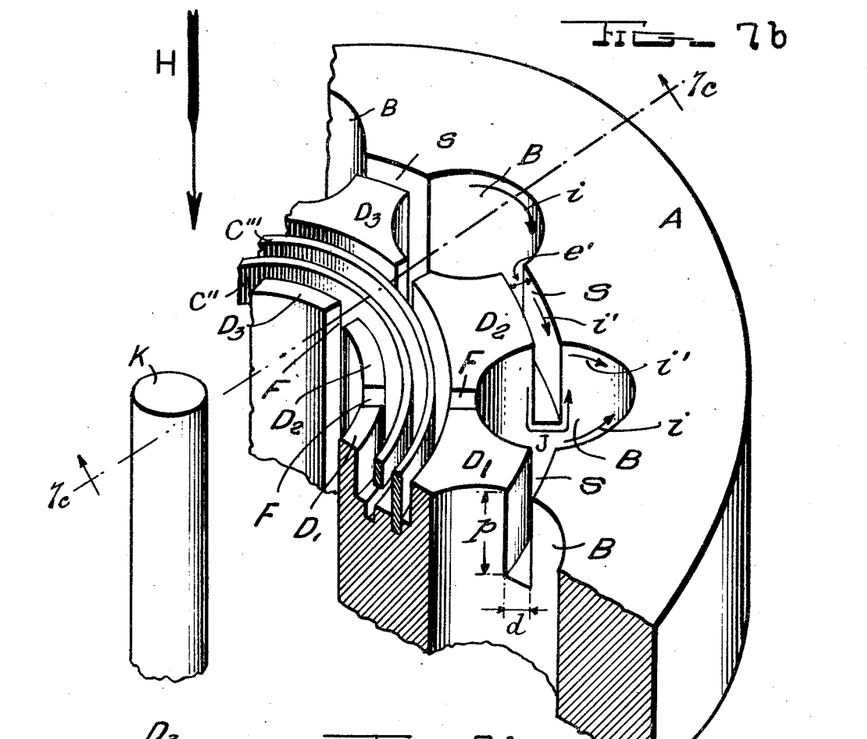
Fig. 7b shows a further embodiment of the invention in which strappings are disposed in the grooves.
Figures 7C, 7D:
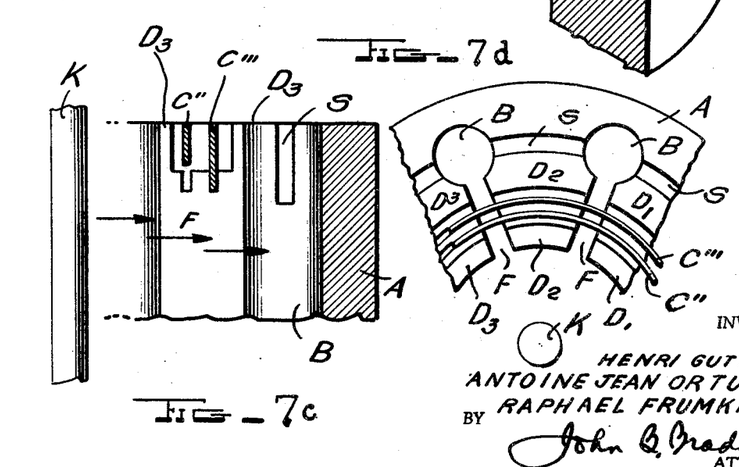
Fig. 7c is a vertical sectional view on line 7c—7c of Fig. 7b.
Fig. 7d is a fragmentary top plan view of Fig. 7b.

In this explanation, it has been assumed that the magnetron was operating according to the mode $\pi$ of oscillation. It is advantageous, in some cases, in order definitely to determine this manner of oscillation, to combine the decoupling grooves described with the usual "straps" that connect the even numbered segments to one another and the odd numbered segments to one another as shown in Figs. 7b—7d. In this arrangement the anode block A surrounds the cathode K and is limited by lateral faces perpendicular to the axis of the cathode and is provided with cylindrical cavities B which are connected to the anode-cathode space through radial slits F forming anode segments D1, D2, D3, etc. The cavities B open at the lateral boundary faces of the anode block A. Grooves S are provided in the mass of the segments between the cavities B near the exterior end of the anode block A. The grooves S have an open trench-like shape and are located on the lateral faces of the anode block A and penetrate to a predetermined depth into the anode block in an axial direction. There are straps C'' and C''' disposed in the anode block A adjacent the anode-cathode space and connected with alternate segments as shown.

In some cases, in order to obtain the desired negative feed-back effect, it is possible to substitute for the grooves a decoupling effect produced by means of straps C'' and C''' of suitable shape and length, that connect the adjacent segments to one another as shown in Figs. 7b, 7c and 7d. As in the previous case, in order to retain the mode $\pi$, the tube may be completed by means of the usual "straps," or use may be made of rounded segments, as hereinbefore explained.

Finally, the decoupling can be obtained by means of an external circuit that connects one cavity to the adjacent cavity, so as to introduce therein a current flowing in the opposite direction. Said circuit should preferably be provided with means for adjusting the degree of decoupling and for adjusting its phase.

By carrying out tests in accordance with the diagram of Fig. 10, it is possible to ascertain the effects obtained as a result of decoupling and the industrial possibilities opened up thereby. The cavities are connected to one another by a groove S, the width $d$ of which is kept constant and the depth $p$ of which is made to vary. By means of a coaxial conductor, an alternating current voltage $V_0$, the amplitude of which is kept constant and the frequency of which is made to vary, is introduced into the cavity $B_2$ and the alternating current voltage $V$ is measured in the coaxial conductor connected to the adjacent cavity $B_1$.

In the case of magnetrons that only have one output lead (oscillator or modulator magnetrons), the curve of the variations of impedance is plotted and gives, as a function of the frequency, the position of the nodes of stationary waves which are introduced by the circuits of the cavities into the coaxial output conductor. These tests should be carried out without electronic coupling. It is even possible, in general, to eliminate the cathode without essentially altering the results.

Fig. 11 shows the evolution of the transmission curve $T$ through a magnetron with two cavities, as a function of a parameter which is the depth $p$ of the groove. Fig. 11a relates to a magnetron which has no groove ($p=0$). It corresponds to the curve of Fig. 4. When $p$ increases, the decoupling is more marked and, for a value $p=p_c$, the critical decoupling between the two circuits is approximately obtained, which is characterized by the maximum flattening of the curve as shown in Fig. 11b. When $p$ is greater than $p_c$, only one band is obtained, the amplitude of which decays (Fig. 11c) until the value $p$ is reached for which the coefficient of transmission continually remains zero. In this case, the current $i'$ from the groove and the current $-i$ from the coupling through the inter-electrode space are equal to one another: the decoupling between the cavities is completely obtained.

Figure 12:
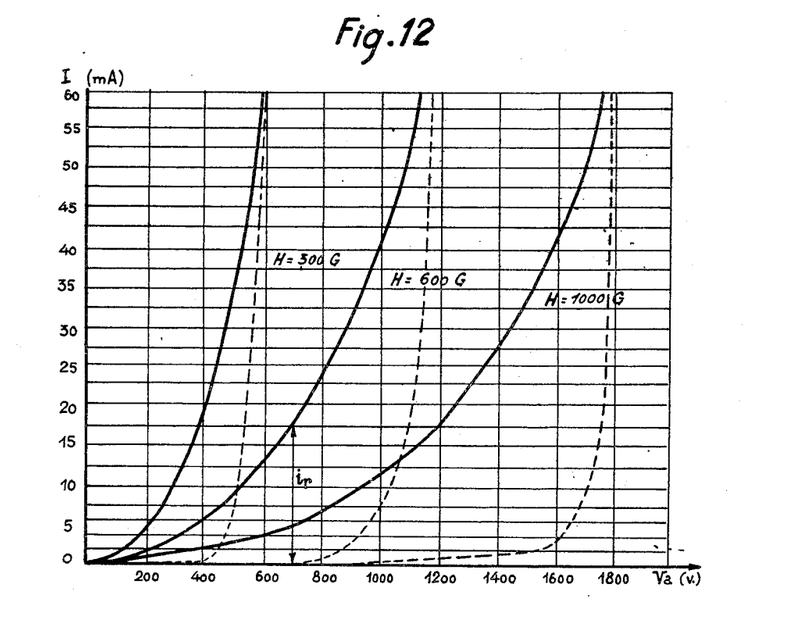
Fig. 12 shows the anode current-anode voltage characteristics for various magnetic fields, as obtained with a negative feed-back magnetron, and the same characteristics as obtained with the same magnetron, but of the ordinary type; it explains the improvement in the operation of a magnetron provided with negative feed-back, as regards background noise.

Fig. 12 shows, in continuous lines, the characteristics of the anode current of a magnetron as a function of the anode voltage for various magnetic fields, as obtained with an ordinary magnetron, and in broken lines, the same characteristics obtained with a decoupled magnetron according to the invention. It can be seen that in ordinary magnetrons there exists a strong residual current $i_r$ for anode voltages which are substantially lower than the voltage required to render the tube conducting. Instead of rapidly assuming a high value and thereby providing a theoretically vertical characteristic, the current has a retarding effect that causes it to increase gradually. Said current $i_r$, for anode and cathode diameters that remain constant, varies considerably with the constituent parameters of the oscillatory circuits, in particular for magnetrons provided with "strapping," with the position and the shape of the strapping wire. It is therefore not due to a particular distribution of the electrostatic field within the inter-electrode space. It forms the greater part of the detected current of internal oscillations in the tube. Said oscillations produce the very intense background noise which is observed in ordinary magnetrons and the intensity of which is proportional to the residual current $i_r$. Said background noise precludes the use of the magnetron in a receiving stage.

It is chiefly and probably solely due to the strong reaction between the cavities which is produced by their natural coupling. The introduction of a sufficient negative feedback by means of the grooves, by decreasing the coupling between the cavities, considerably reduces the internal oscillations due to the reaction between the circuits and consequently substantially reduces the background noise.

The experiments made by the applicants have in fact shown that the residual current becomes smaller and smaller as the depth of the grooves is increased. They succeeded in obtaining, for a suitable depth, a value nearly one thousand times lower than that of a magnetron without a groove under the same testing conditions. In Fig. 12, the characteristics have been plotted, in broken lines, of a magnetron which is identical to the magnetron without grooves as regards the diameters of the anode and cathode and the cavities, but which is provided with grooves 12 mm. deep and 3 mm. wide, for cavities of 8 mm. diameter and 20 mm. depth (resonance frequency 3,000 megacycles). It will be seen that in this case the residual current $i_r$ is almost zero. On the other hand, for voltages nearly equal to the voltage required to render the tube conducting, the current increases very rapidly and assumes values which are more and more nearly equal to those of the magnetron without a groove, so that the characteristic curves of the two tubes finally coincide in one and the same curve. The theoretical advantage of the magnetron provided with grooves becomes very important, since it has characteristics which are very nearly those obtained by calculation of the electrostatic distribution of the fields. Its practical advantage is no less great since, owing to the very considerable decrease of the background noise which is obtained thereby, it enables the magnetron to be used in all the stages of a receiver and in particular in the first stages of amplification in which the signal level is comparatively low and the part played by the background noise is very important.

While we have described our invention in certain of its preferred embodiments we realize that certain modifications may be made and we desire that it be understood that no limitations upon our invention are intended other than may be imposed by the scope of the appended claims.

What we claim is:

1. A magnetron comprising an emitting cathode, an anode block surrounding said cathode and limited by lateral faces perpendicular to the axis of said cathode and provided with cylindrical cavities which are connected to the anode-cathode space through radial slits and forming anode segments, said cavities opening at the lateral boundary faces of the anodic block, grooves provided in the mass of segments between said cavities, near the exterior end of said anodic block, said grooves being of an open trench-like shape and located on said lateral faces and penetrating to a predetermined depth into the anodic block in an axial direction and means constituted by straps for stabilizing the condition of oscillation of said magnetrons and interconnecting alternately the anode segments, said cavities being subjected to a magnetic field extending in an axial direction.

2. In a magnetron comprising an emitting cathode, an anodic block surrounding said cathode and limited by lateral faces perpendicular to the axis of said cathode, said anodic block including a plurality of resonant cavities provided in the mass of said anodic block and forming anode segments therein, said cavities opening in the anode-cathode space and opening at the said lateral faces, straps disposed in the anodic block adjacent the anode-cathode space and connecting alternate segments, the exterior end of said anodic block being provided with grooves adjacent the said exterior end and remote from said cathode directly connecting one cavity to the adjacent cavity, said grooves being of an open trench-like shape and located on said lateral faces and penetrating to a predetermined depth into the anodic block and subjected to a magnetic field extending in the axial direction of the magnetron.

3. In a magnetron comprising an emitting cathode, an anodic block surrounding said cathode and limited by lateral faces perpendicular to the axis of said cathode, said anodic block including a plurality of cylindrical cavities provided in the mass of said anodic block, said cylindrical cavities being connected through radial slits to the anode-cathode spaces, said cavities and said slits opening at the said lateral faces and forming anode segments therein, straps connecting alternatively the parts of said anode segments located between said slits, grooves provided in the mass of said anodic block between the said cylindrical cavities and directly connecting one cavity to the adjacent cavity, said grooves being of an open trench-like shape and located on said lateral faces substantially near the exterior end of the anodic block, the said grooves penetrating to a predetermined depth into the anodic block and subjected to a magnetic field extending in the axial direction of the magnetron.

References Cited in the file of this patent

UNITED STATES PATENTS

| Number | Name | Date |
|---|---|---|
| 2,280,824 | Hansen et al. | Apr. 28, 1942 |
| 2,295,680 | Mouromtseff | Sept. 15, 1942 |
| 2,411,151 | Fisk | Nov. 19, 1946 |
| 2,415,253 | Linder | Feb. 4, 1947 |
| 2,418,469 | Hagstrum | Apr. 8, 1947 |
| 2,433,481 | Retherford | Dec. 30, 1947 |
| 2,497,831 | De Vore | Feb. 14, 1950 |
| 2,535,713 | Wooten | Dec. 26, 1950 |